United States Patent [19]

Shibata et al.

[11] Patent Number: 5,410,234
[45] Date of Patent: Apr. 25, 1995

[54] MOTOR DRIVE CONTROL APPARATUS

[75] Inventors: Akihito Shibata; Hisashi Kondo, both of Niwa, Japan

[73] Assignee: Okuma Corporation, Aichi, Japan

[21] Appl. No.: 9,253

[22] Filed: Jan. 26, 1993

[30] Foreign Application Priority Data

Jan. 28, 1992 [JP] Japan .................... 4-037298

[51] Int. Cl.$^6$ .............................. H02P 1/46
[52] U.S. Cl. ................... 318/700; 318/806; 318/815; 318/821; 318/822; 318/823; 318/609
[58] Field of Search ............... 318/806, 815, 821, 822, 318/823, 609, 700

[56] References Cited

U.S. PATENT DOCUMENTS

| | | | |
|---|---|---|---|
| 4,887,015 | 12/1989 | Kurakake et al. | 318/609 |
| 5,038,092 | 8/1991 | Asano et al. | 318/806 |
| 5,063,335 | 11/1991 | Baechtel et al. | 318/609 |
| 5,101,145 | 3/1992 | Rehm | 318/609 |
| 5,153,491 | 10/1992 | Fujioka et al. | 318/806 |
| 5,196,778 | 3/1993 | Hayashida | 318/807 |

*Primary Examiner*—William M. Shoop, Jr.
*Assistant Examiner*—Karen Masih
*Attorney, Agent, or Firm*—Wenderoth, Lind & Ponack

[57] ABSTRACT

A motor drive control apparatus having an electrical power amplifier for supplying an electrical power to a motor, and a current control loop and speed control loop for controlling the drive of the motor, which includes a current feedforward component calculation section for creating voltage commands to be imposed on respective phases from current commands for the respective phases for the motor and the impedance model of the motor for carrying out a feedforward control by using the voltage commands to be imposed on the respective phases. With the above arrangement, the motor drive control apparatus can create the voltage commands to be imposed on the respective phases regardless of the existence of control dead time elements such as a limited gain set in control loops, and the like so that a command follow-up property is improved when a torque is changed, a follow-up error is reduced over an entire region when the torque is changed, and further a stable control can be achieved in the same way as a conventional apparatus at a steady time.

3 Claims, 8 Drawing Sheets

MOTOR DRIVE CONTROL APPARATUS

BACKGROUND OF THE INVENTION

1. Field of the Invention

The present invention relates to a motor drive control apparatus having a feedforward control element, and more specifically, to a motor drive control apparatus for improving the follow-up response of a motor when a speed increase/decrease command is issued.

2. Description of the Related Art

FIG. 1 is a block diagram showing the arrangement of an example of a prior art motor drive control apparatus and the operation thereof will be described below. Present position data Pa of a motor 11 is obtained when a signal from a position detector 10 mechanically coupled to the motor 11 is processed by a position detecting section 5. A positional error amount Pe is obtained when the present position data Pa of the motor 11 is subtracted from the value of a movement position command Pr which is generated by a position command generating section (not shown in FIG. 1). A speed command Vr is generated in a speed command calculation section 1 based on the amount of the positional error Pe. Further, present speed data Va of the motor 11 is determined in a speed detecting section 3 based on an expression (1) from the present position data of two present positions continued in time.

$$Vai = (Pai_{+1} - Pai)/\Delta Tps \tag{1}$$

where,
i: integer showing a time series number
$\Delta Tps$: present position data detecting cycle A speed error amount Ve is obtained by taking the difference between the present speed data Va and the speed command Vr which are obtained as described above. A torque command Tr is generated by carrying out a known proportional plus integral control calculation with respect to the speed error amount Ve in a speed PI-calculation section 2.

Assuming that the motor 11 is an AC brushless motor (synchronous motor), the relationship between a current flowing through the motor 11 and a generated torque will be described. Assuming that the permanent magnet mounted to a rotor has a maximum densits Be, flux densities Bu, Bv and Bw perpendicular to the respective phases U, V and W of the motor 11 are represented by expressions (2) to (4), respectively.

$$Bu = Bo \cdot \cos \theta \tag{2}$$

$$Bv = Bo \cdot \cos (\theta + 2\pi/3) \tag{3}$$

$$Bw = Bo \cdot \cos (\theta + 4\pi/3) \tag{4}$$

Further, currents Iu, Iv and Iw having a maximum value Io flow to the windings of the three phases of a stator, as shown in expressions (5) to (7).

$$Iu = Io \cdot \cos \theta \tag{5}$$

$$Iv = Io \cdot \cos (\theta + 2\pi/3) \tag{6}$$

$$Iw = Io \cdot \cos (\theta + 4\pi/3) \tag{7}$$

Assuming that the winding of the stator has an average radius r and an effective length le, a torque produced in the motor 11 is represented by an expression (8) in accordance with Fleming's left hand rule.

$$\begin{aligned} T &= B \cdot I \cdot le \cdot r \\ &= le \cdot r \{Io \cdot \cos\theta \cdot Bo \cdot \cos \theta + \\ &\quad Io \cdot \cos(\theta + 2\pi/3) \cdot Bo \cdot \cos(\theta + 2\pi/3) + \\ &\quad Io \cdot \cos(\theta + 4\pi 3) \cdot Bo \cdot \cos(\theta + 4\pi/3)\} \\ &= le \cdot r \cdot 3Io \cdot Bo/2 \\ &= Kt \cdot Io \end{aligned} \tag{8}$$

where,
$Kt = 3le \cdot r \cdot Bo/2$

Therefore, the maximum value Io of a current flow must be as shown in an expression (9) in order to produce a rotational torque in coincidence with the torque command Tr in the motor 11.

$$Io = Tr/Kt \tag{9}$$

A phase current command calculation section 4 for each phase first determines the position $\theta$ of the U-phase winding of the stator at a particular time from the present position data Pa of the motor 11. Next, the command values Iur and Ivr of currents which to the U- and V-phase windings of the motor are derived from expressions (10) and (11) based on the aforesaid point of view.

$$Iur = Tr \cdot \sin \theta \tag{10}$$

$$Ivr = Tr \cdot \sin (\theta + 2\pi/3) \tag{11}$$

On the other hand, the data of a current sensor for sensing the currents of the U- and V-phase windings of the motor 11 is transferred to a current detecting section 6, which generates feedback current data Iua and Iva. Current error amounts Iue and Ive of the respective phases are determined by obtaining the differences between the current command values Iur and Ivr and the feedback current data Iua and Iva. Voltage commands Vur and Vvr to be imposed on the windings of the respective phases are generated by causing the current error amounts Iue and Ive of the respective phases to be subjected to a known proportional plus integral control calculation in a PI-calculation section 7. Since a vector sum of the currents flowing through the respective phases is controlled to be zero in the motor 11, when the current command values for two phases of the three phases are determined, a command value for the remaining one phase can be simply determined. Then, a PWM control section 8 is input with the voltage commands Vur and Vvr to be imposed on the U- and V-phases determined by the proportional plus integral calculation carried out in the PI-calculation section 7 and the voltage commands Vur and Vvr and to be imposed on a W-phase. The PWM control section 8 carries out a known PWM control operation based on these imposing voltage commands Vur, Vvr, Vwr so that a voltage output from an electrical power amplifier 9 is controlled.

FIGS. 2A to 2C are diagrams showing an example of the relationship between the torque command, the current command, the PWM voltage command for a single phase, and the feedback current and the current error amount. These figures are described based on the following premise:

speed control cycle (torque command generating cycle) is twice as long as that of a current control cycle (PWM voltage command generating cycle);

calculation dead time for each control loop is assumed to be zero; and torque command generated in a speed control loop is not commanded to a current control loop until a next speed control cycle begins. In FIG. 2A, a torque command generated in the speed control cycle starting from a time t0 is assumed to be made effective from the first current control cycle included in the speed control cycle time starting from a time t2.

Under the aforesaid premise, as shown in FIG. 2A, it is assumed that a torque command Tr0 changing stepwise from zero to a certain value in the speed control cycle starting from the time t0 and current commands Iur0 and Iur1 corresponding to it have been generated. The current command Iur0 is made effective in the first current control cycle at and after the time t2. A difference between the stepwise input current command Iur0 and an actually detected feedback current value, i.e., a current error amount Iue0 is calculated in this current control cycle and subjected to the known proportional plus integral control calculation to thereby generate a PI-calculation voltage command Vur0. For the convenience of the descriptions, since it is assumed that this processing for the current control calculation is started from the time t2 and the calculation dead time is zero, FIGS. 2B and 2C are made on the basis that the stepwise input current command Iur0, current error amount Iue0 and PI-calculation voltage command Vur0 are fixed at the time t2. A voltage output from the electrical power amplifier 9 is controlled by the PWM control section 8 which carries out the known PWM control operation based on the PI-calculation voltage command Vur0, and as a result a current flows through the motor 11 and a feedback current shown by a thick line in FIG. 2B is detected. Thereafter, similar commands are calculated and generated, respectively, with respect to torque commands generated at the times t2, t4, . . . and a control is carried out such that a finally commanded torque is produced to the motor 11.

As described above, a current, a speed and a position are feedback-controlled by a current feedback loop, a speed feedback control and a position feedback control respectively so that amounts of the current error, the speed error and the positional error of the respective phases become zero.

A follow-up error of a motor to a command is made large particularly when a torque is abruptly changed because a gain in a control loop cannot be set infinitely large and there is a control dead time element. Since, however, a prior art motor drive control apparatus is arranged as described above, there is no adjustment means except the adjustment of each loop gain to adjust a speed response and a current response by which the command follow-up property of the motor is determined. In this case, since a gain is adjusted and set in consideration of a steadily control operation, there is no means for improving the follow-up property only when a torque is abruptly changed. Thus, when a control gain is set to a large value to improve the follow-up property at the time the torque is changed, problems such as the occurrence of hunting and vibration, and the like are caused because the set gain is too large as a gain at a steady time.

SUMMARY OF THE INVENTION

An object of the present invention made by taking the above circumstances into consideration is to provide a motor drive control apparatus for improving a command follow-up property when a torque is changed and reducing a follow-up error over an entire torque changing region.

The present invention relates to a motor drive control apparatus having an electrical power amplifier for supplying electrical power to a motor, and a current control loop and a speed control loop for controlling the drive of the motor, and the above object of the present invention can be achieved by comprising a current feedforward component calculation section for generating voltage commands to be imposed on respective phases from current commands for the respective phases to the motor and the impedance model of the motor and carrying out a feedforward control by using the voltage commands to be imposed on the respective phases.

Since the present invention includes the current feedforward component calculation section for generating the voltage commands to be imposed on the respective phases from the current commands for the respective phases to the motor and the impedance model of the motor and carries out the feedforward control by using the voltage commands for the respective phases, it can generate the voltage commands to be imposed on the respective phases regardless of the existence of control dead time elements such as a limited gain set in control loops, and the like so that a command follow-up property is improved when a torque is changed, a follow-up error is reduced over an entire region when the torque is changed, and further a stable control can be achieved in the same way as a conventional apparatus at a steady time.

DESCRIPTION OF THE PREFERRED EMBODIMENT

Figure 1:
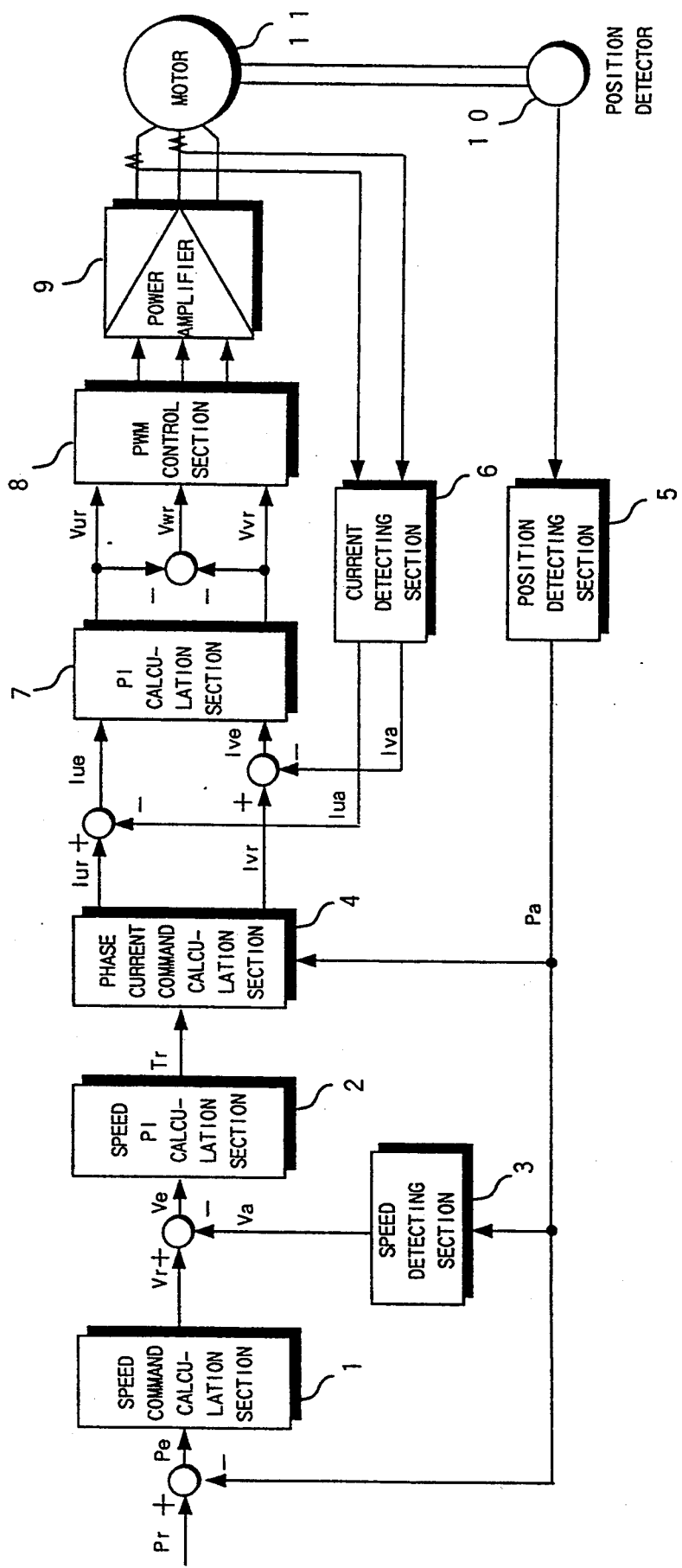
FIG. 1 is a block diagram of an example of a prior art motor drive control apparatus.
Figure 3:
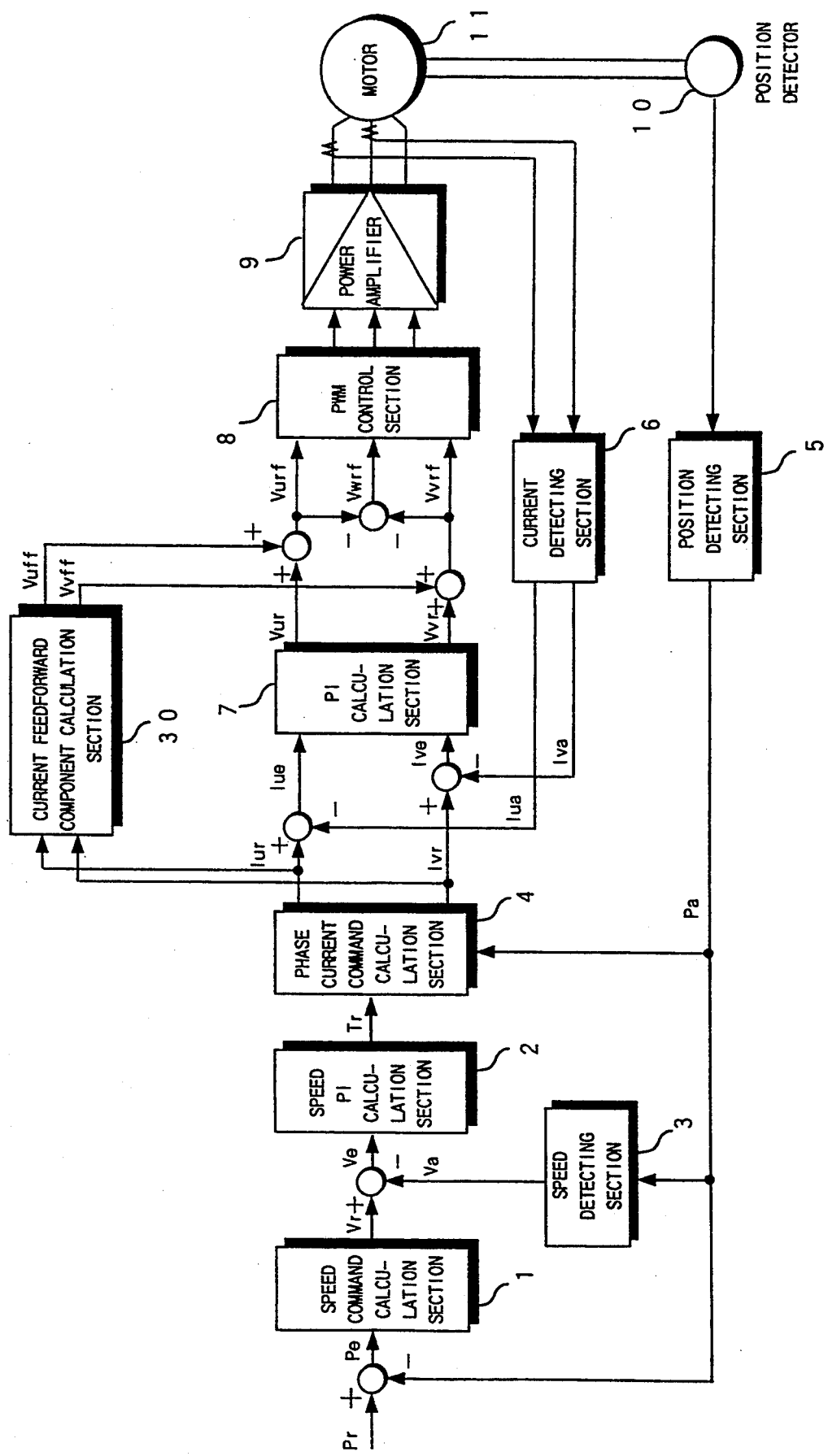
FIG. 3 is a block diagram of an example of a motor drive control apparatus according to the present invention.

FIG. 3 is a block diagram of an arrangement of an example of a motor drive control apparatus according to the present invention shown in correspondence with FIG. 1, wherein the same numerals as used in FIG. 1 are used in FIG. 3 to designate the same parts and the descriptions thereof have been omitted. When a torque command Tr is not changed, a motor 11 is controlled in the entirely same manner as that of the prior art apparatus. When, however, the torque command Tr is changed, the operation of the motor 11 is controlled differently from a conventional operation due to the addition of a current feedforward component calculation section 30.

Figure 4:
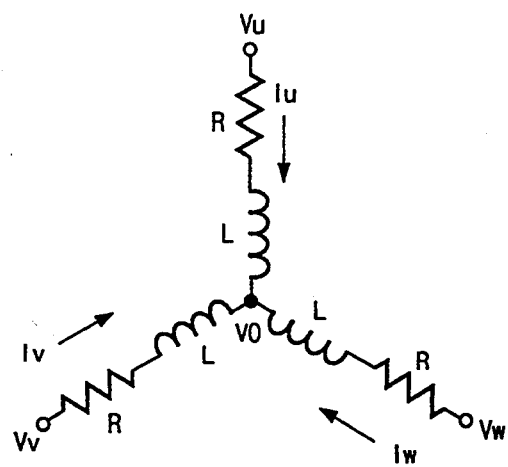
FIG. 4 is a diagram showing an impedance model for determining a current of the respective phases of a synchronous motor in the apparatus according to the present invention shown in FIG. 3.

First, a feedforward component calculation method will be described. Now, the motor 11 to be controlled is assumed to be a Y-wiring model as shown in FIG. 4. The resistances and inductances of the windings of respective phases U, V and W are assumed to have the same values and are represented by R and L respectively. Further, currents flowing through the respective phases U, V and W are represented by Iu, Iv and Iw, respectively. And voltages imposed on the respective phases U, V, W and a neutral point voltage are represented by Vu, Vv, Vw and V0, respectively. At this time, voltages induced in the windings of the respective phases by the permanent magnet of a rotor have not been considered. Expressions (12) to (14) are established between the voltages Vu, Vv and Vw and the currents Iu, Iv and Iw of the respective phases U, V and W.

$$Vu - V0 = L \frac{dIu}{dt} + R \cdot Iu \tag{12}$$

$$Vv - V0 = L \frac{dIv}{dt} + R \cdot Iv \tag{13}$$

$$Vw - V0 = L \frac{dIw}{dt} + R \cdot Iw \tag{14}$$

Further, since $Iw = -(Iu + Iv)$, when this is substituted for the expression (14), an expression (15) can be obtained.

$$V0 = Vw + L \frac{d(Iu + Iv)}{dt} + R \cdot (Iu + Iv) \tag{15}$$

Then, when the above expression (15) is substituted for the expression (12), the expression (18) shown below can be obtained.

$$2 \frac{dIu}{dt} + \frac{dIv}{dt} = \frac{1}{L} \{Vu - Vw - R \cdot (2Iu + Iv)\} \tag{16}$$

When the expression (15) is substituted for the expression (13) in the same way, the expression (17) shown below can be obtained. Further, expressions (18) and (19) are obtained from the expressions (16) and (17).

$$\frac{dIu}{dt} + 2 \frac{dIv}{dt} = \frac{1}{L} \{Vv - Vw - R \cdot (Iu + 2Iv)\} \tag{17}$$

$$\frac{dIu}{dt} = \frac{1}{3L} (2Vu - Vv - Vw - 3R \cdot Iu) \tag{18}$$

$$\frac{dIv}{dt} = \frac{1}{3L} (2Vv - Vu - Vw - 3R \cdot Iv) \tag{19}$$

Then, the expressions (18) and (19) are shown together as a below expression (20).

$$\frac{d}{dt} \begin{bmatrix} Iu \\ Iv \end{bmatrix} = \begin{bmatrix} -R/L & 0 \\ 0 & -R/L \end{bmatrix} \begin{bmatrix} Iu \\ Iv \end{bmatrix} + \begin{bmatrix} 2/3L & -1/3L & -1/3L \\ -1/3L & 2/3L & -1/3L \end{bmatrix} \begin{bmatrix} Vu \\ Vv \\ Vw \end{bmatrix} \tag{20}$$

Here, it is assumed that a three-phase-balanced state, i.e., "Vw = -Vu - Vv" is maintained and this state is substituted for the expressions (18) and (19) to obtain an expression (21).

$$\frac{d}{dt} \begin{bmatrix} Iu \\ Iv \end{bmatrix} = \begin{bmatrix} -R/L & 0 \\ 0 & -R/L \end{bmatrix} \begin{bmatrix} Iu \\ Iv \end{bmatrix} + \begin{bmatrix} 1/L & 0 \\ 0 & 1/L \end{bmatrix} \begin{bmatrix} Vu \\ Vv \end{bmatrix} \tag{21}$$

The voltages Vu and Vv imposed on the respective phases U and V can be determined from the expression (21) by substituting current commands Iuu and Iuv for the respective phases U and V for an expression (22).

$$\begin{bmatrix} Vu \\ Vv \end{bmatrix} = \begin{bmatrix} L & 0 \\ 0 & L \end{bmatrix} \begin{bmatrix} dIu/dt \\ dIv/dt \end{bmatrix} + \begin{bmatrix} R & 0 \\ 0 & R \end{bmatrix} \begin{bmatrix} Iu \\ Iv \end{bmatrix} \tag{22}$$

Figure 5:
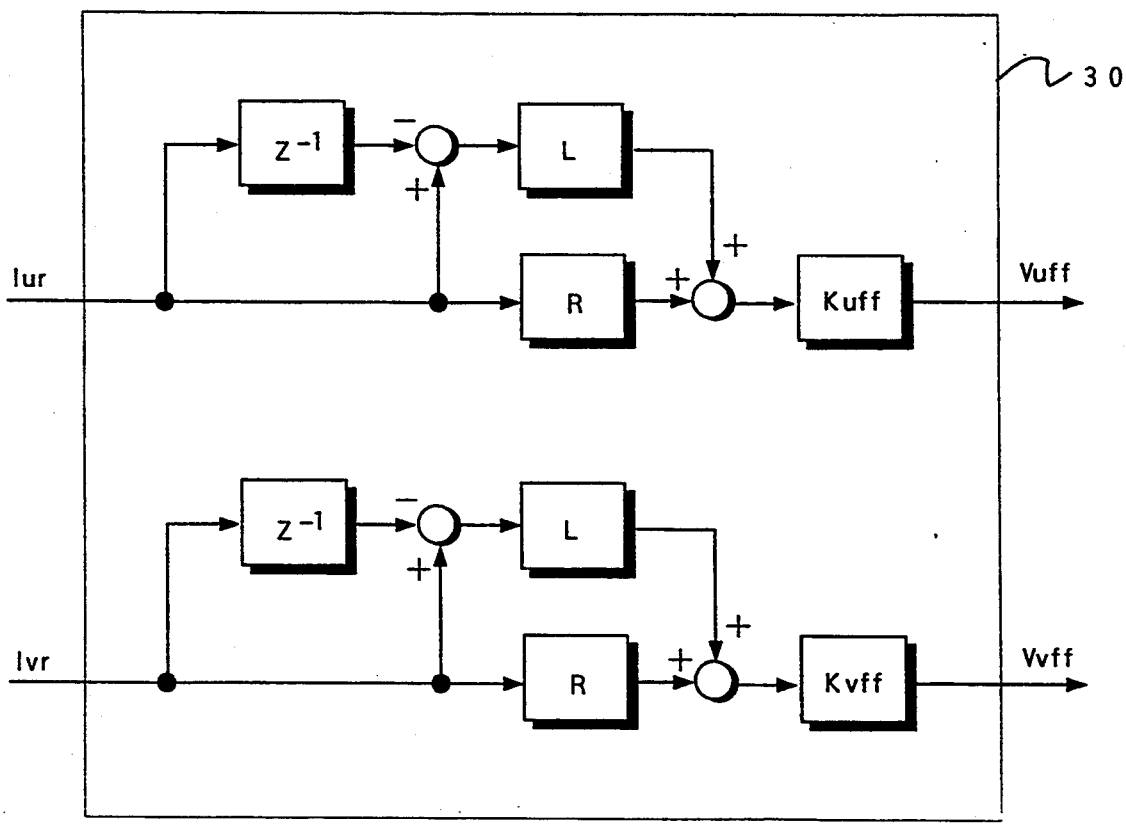
FIG. 5 is a block diagram showing a detailed example of the main part of the apparatus according to the present invention shown in FIG. 3.

FIG. 5 shows a detailed block diagram of the feedforward component calculation section 30 designed based on the above point of view, wherein, "$Z^{-1}$" represents a time delay operator in a discrete-time system; L and R represent the parameters of the inductance and resistance values of a particular winding; Kuff and Kvff represent feedforward gains of the U- and V-phases, respectively; and Vuff and Vvff represent voltage commands of the feedforward components imposed on the windings of the U- and V-phases, respectively. When the torque command Tr is changed, the current commands Iur and Ivr created by a phase current command calculation section 4 for the respective phases U, V and W are also changed in correspondence with the change of the torque command Tr, and thus an imposing voltage command component relating to the inductance and resistance of the windings of the stator of the motor 11 is calculated by the current feedforward component calculation section 30. A value obtained by multiplying the thus calculated value by the feedforward gain of each phase is added to each of voltage commands Vur and Vvr calculated from the current error amounts Iue and Ive of the respective phases U and V, and thus, PWM voltage commands (Vurf, Vvrf), which are added to the feedforward component, are created and transferred to a PWM control section 8. Further, since the relationship between a current command value and a torque command value is shown by the expressions (10) and (11), an expression (23) can be obtained by determining the relationship between a voltage imposed on each phase and the torque command value.

$$\begin{bmatrix} Vu \\ Vv \end{bmatrix} = \begin{bmatrix} L\sin\theta & 0 \\ 0 & L\sin(\theta + 2\pi/3) \end{bmatrix}. \tag{23}$$

-continued $$dTr/dt + \begin{bmatrix} R\sin\theta, & 0 \\ 0, & R\sin(\theta + 2\pi/3) \end{bmatrix} \cdot Tr$$

As soon as the torque command value is determined by the above expression (23), the voltage to be imposed on each phase can be calculated.

Figure 2A:
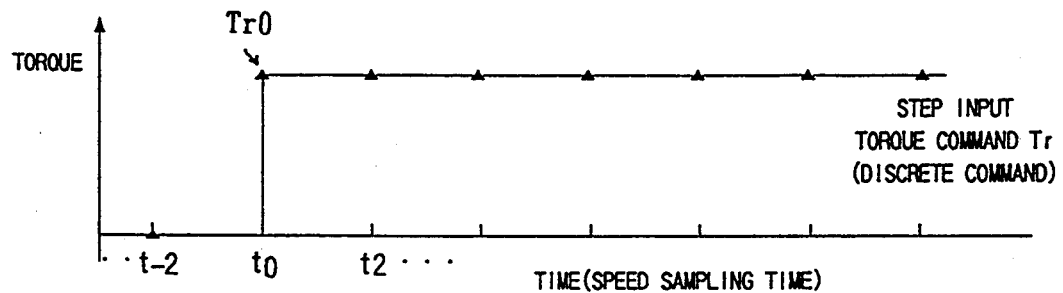
FIGS. 2A to 2C are diagrams showing the relationship between a torque command, current command, PWH voltage command and feedback current and amount of current error in the prior art apparatus.
Figure 2B:
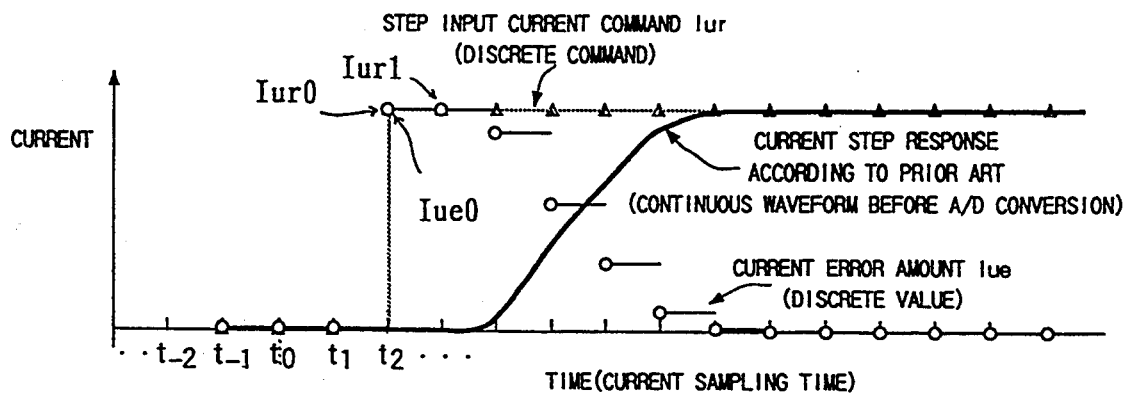
Figure 2C:
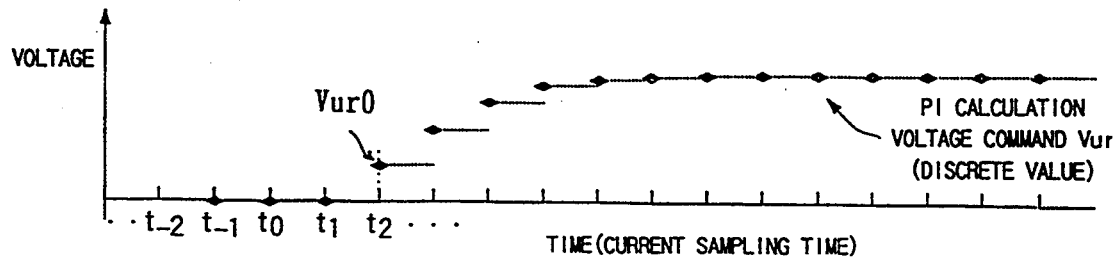
Figure 6A:
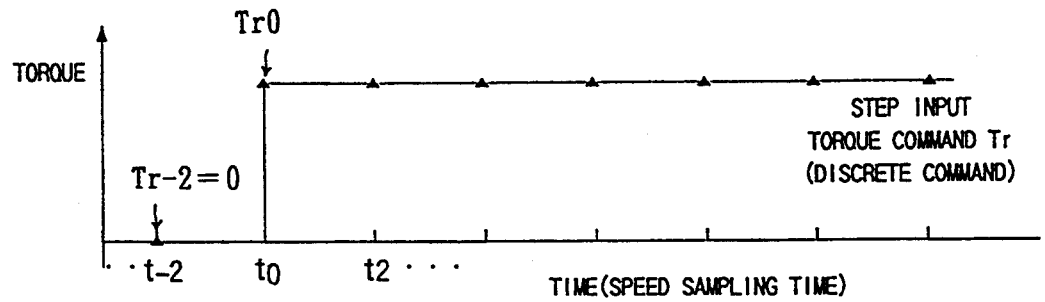
FIGS. 6A to 6C are diagrams showing the relationship between a torque command, a current command, a PWM voltage command and a feedback current and a current error amount in the apparatus according to the present invention.
Figure 6B:
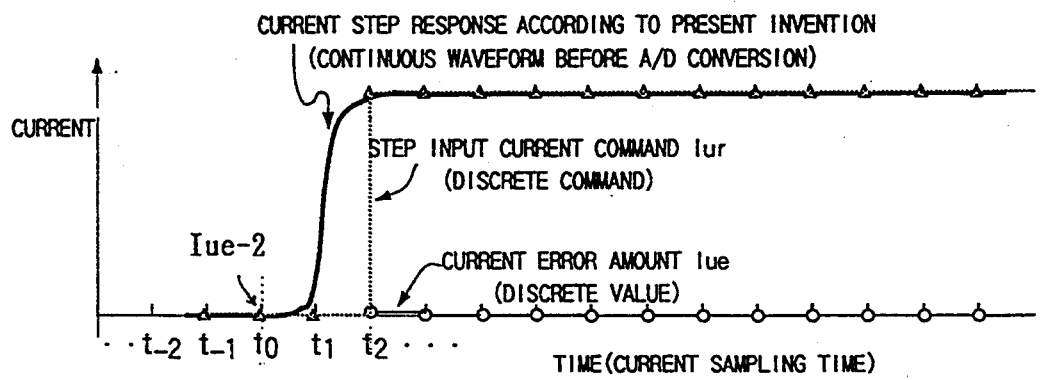
Figure 6C:
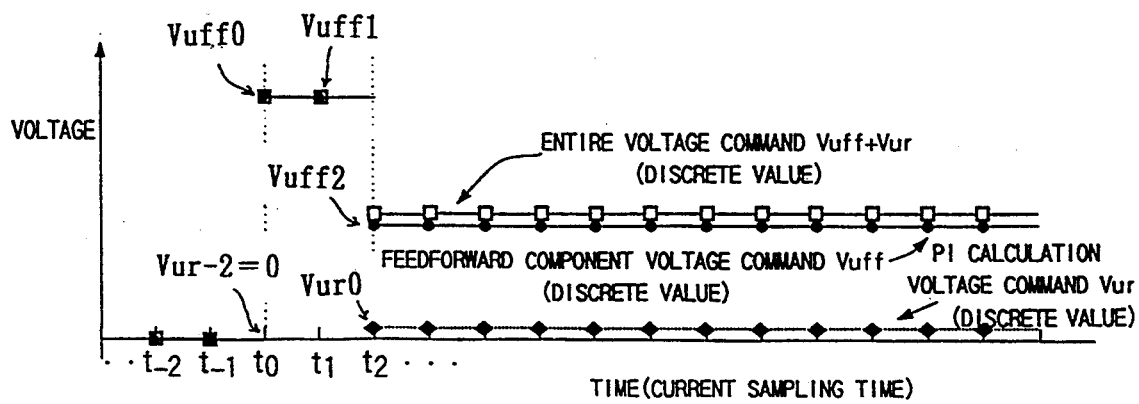

FIGS. 6A to 6C shows an example of the relationship between a torque command, a current command and a PWM voltage command for a single phase (U-phase) and a feedback current and a current error amount, wherein the description is made based on the same premise as that of FIGS. 2A to 2C explaining the prior art. As shown in FIG. 6A, a torque command Tr0 is assumed to be created which is zero before a time t0 and changed stepwise to a certain value at the time t0. As soon as the torque command Tr0 is created, a feedforward component voltage command Vuff0 is calculated in a particular speed control cycle by multiplying a feedforward coefficient Kuff by an imposing voltage command value Vur0. Using said Tra and $Tr_{-2}$, the Vur0 is derived from the expressions (10), (11) and (22), or from the expression (23). The feedforward component voltage command Vuff0 becomes a final entire voltage command in the current control cycle just after the calculation of the feedforward component voltage command Vuff0 by being added to a PI-calculation voltage command $Vur_{-2}$ calculated from a current error amount $Iue_{-2}$ relating to a past torque command value $Tr_{-2}$ by a PI-calculation.

In the case of FIG. 6A, since it is assumed that a train of torque commands before time t0 is made zero and a train of current error amount is not produced, a train of PI-calculation voltage commands before a PI-calculation voltage command Vu0 corresponding to the torque command Tr0 is zero and thus "the feedforward component voltage command Vuff0+the PI-calculation voltage command" are represented by the expression (24).

$$Vuff0 + Vur_{-2} = Vuff0 \qquad (24)$$

More specifically, the entire voltage command value is equal only to the feedforward component voltage command Vuff0 or Vuff1 until the time t2 is reached. Therefore, the feedforward component voltage command Vuff is imposed on the windings of the motor 11 before the PI-calculation voltage command Vur is produced and thus an actually flowing current can rise steeply by setting a feedforward coefficient Kuff and the like. It is in the first current control cycle after the time t2 that a stepwise input current command Iur0 corresponding to the stepwise input torque command Tr0 is made effective in the same way as prior art. A current error amount Iue0 is calculated in the current control cycle in the same way as prior art and a PI-calculation voltage command Vur0 is created from the current error amount Iue0. Since the feedforward component voltage command Vuff0 or Vuff1 is imposed on the windings of the motor 11 before the current control cycle and a current begins to flow as described above, the current error amount Iue0 calculated in the current control cycle is smaller than that of prior art, as shown in FIG. 6B.

A feedforward component voltage command Vuff2 applied to the current control cycle is calculated only from a voltage command component (R component) due to the winding resistance of the motor of the expressions (22) or (23) except the voltage command component (L-component) due to the winding inductance of the motor. This is based on the following point of view:

Although a voltage torque due to the L component is transiently greatly changed when a torque is abruptly changed and has a relatively large amount, it is made zero as time passes:

A voltage command due to the R component is steadily produced and thus a given voltage command depending upon the value of a winding resistance must be continuously output as long as a torque command is not changed.

Therefore, as shown in FIG. 6C, the feedforward component voltage command ruff corresponding to FIG. 6A is large in "Vuff0" and "Vuff1" and has a relatively small given value in "Vuff2" and thereafter. In this current control cycle, the entire PWM voltage command is generated by adding the PI-calculation voltage command Vur0 and the feedforward component voltage command Vuff2, and transferred to the PWM control section. Thereafter, respective commands are calculated and created with respect to the torque commands created at the times t2, t4, . . . in the same way and a finally commanded torque is controlled to be produced in the motor.

This operation corresponds to the change of a torque command (change of a current command to each phase) and thus even if a current feedback is changed for any reason, the operation is not affected by an output from the feedforward component calculation section 30 and stable. Further, when the feedforward component calculation section 30 is in operation, since a voltage command to the PWH control section 8 can be changed before voltage commands (Vur, Vvr) created by a primary delay by a current feedback loop by the addition of the feedforward component make an effective change, the time delay element of the current feedback loop can be removed to thereby improve a command follow-up property. Further, the command follow-up property can be adjusted by the adjustment of a feedforward gain.

Note, the feedforward coefficients Kuff and Kvff in FIG. 5 may be independently set, respectively, with respect to the voltage command component (L component) due to the winding inductance of the motor and the voltage command component (R component) due to the winding resistance of the motor (a value of the coefficient which can be set includes zero). Further, these coefficients may be set and changed in synchronism with a current control cycle.

Figure 7:
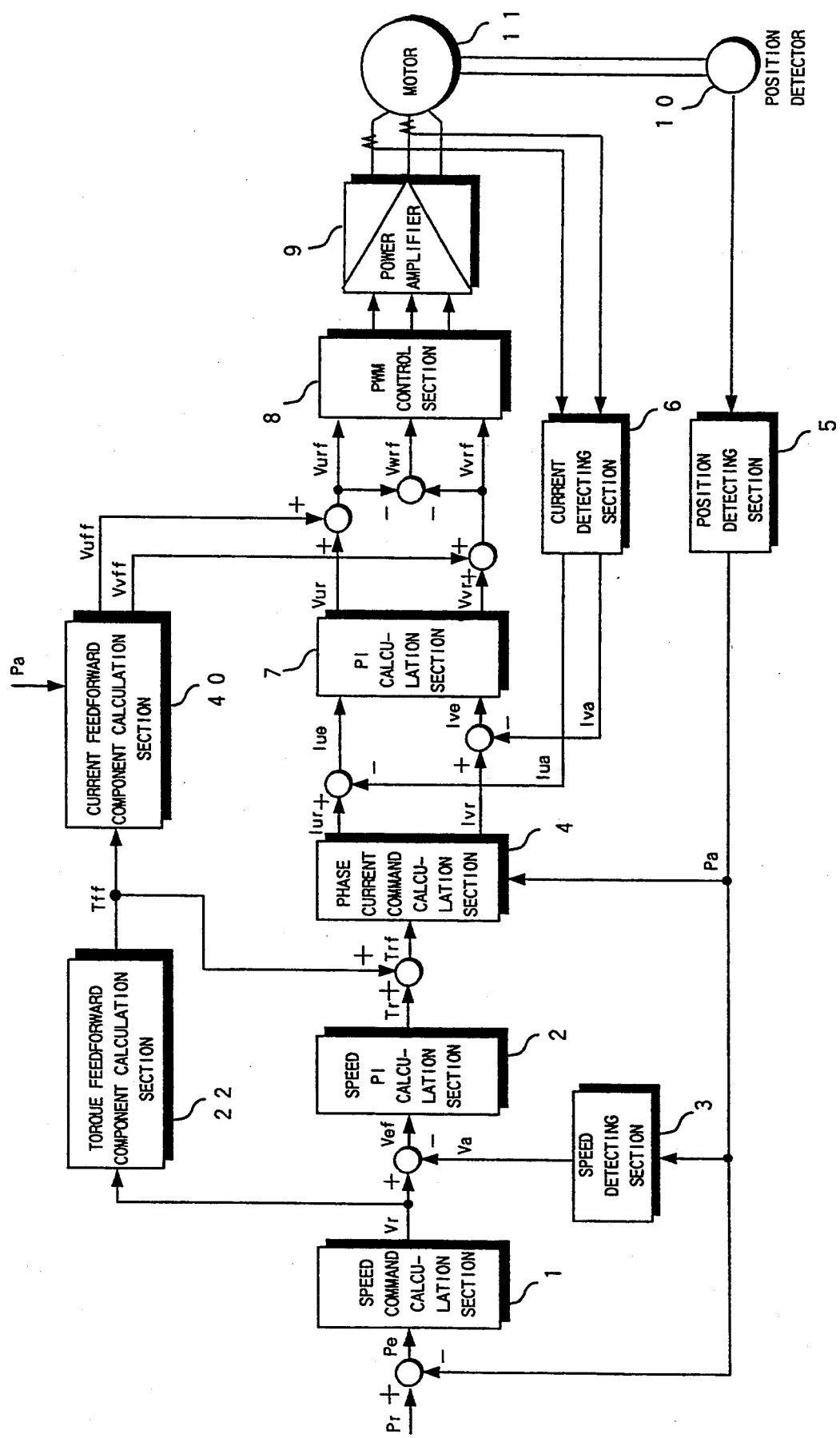
FIG. 7 is a block diagram of the arrangement showing another example of the motor drive control apparatus according to the present invention.
Figure 8:
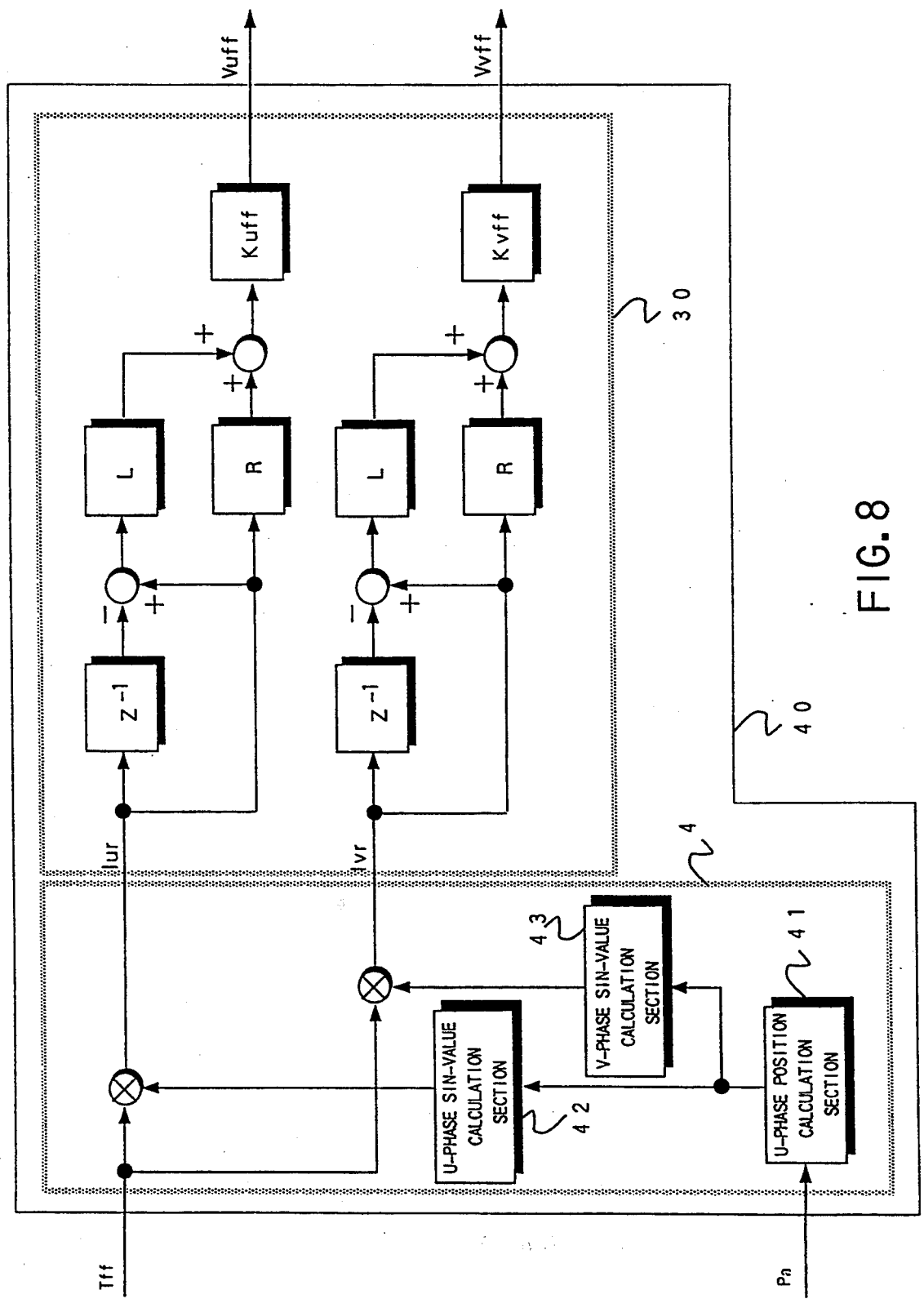
FIG. 8 is a block diagram showing a detailed example of the main part of the apparatus according to the present invention shown in FIG. 7.

FIG. 7 is a block diagram of the arrangement showing another example of the motor drive control apparatus according to the present invention. That is, the motor drive control apparatus includes a torque feedforward component calculation section 22 for creating a torque command Tff from a speed command Vr corresponding to a motor 11 by a feedforward method, and a current feedforward component calculation section 40 for creating the voltage commands Vuff and Vvff to be imposed on the respective phases U and V in such a manner that current commands Iur and Ivr for the respective phases U and V are created for the motor 11 from the torque command Tff and the position information of the motor 11 and then voltages commands Vuff and Vvff to be imposed on the respective phases are created from these current commands Iur and Ivr for the respective phases and the impedance model of the motor 11. The motor drive control apparatus carries out a feedforward control by using these voltage commands Vuff and Vvff imposed on the respective phases to thereby improve a command follow-up property by removing the time delay element of the speed and current feedback loops, when a speed command is changed. In this case, the torque command Tff can be obtained by differentiating the speed command Vr once, as is well known in the art. FIG. 8 shows the current feedforward component calculation section 40 in detail which is composed of the current feedforward component calculation section 30 shown in FIG. 5 combined with a phase current command calculation section 4 for each phase.

Figure 9:
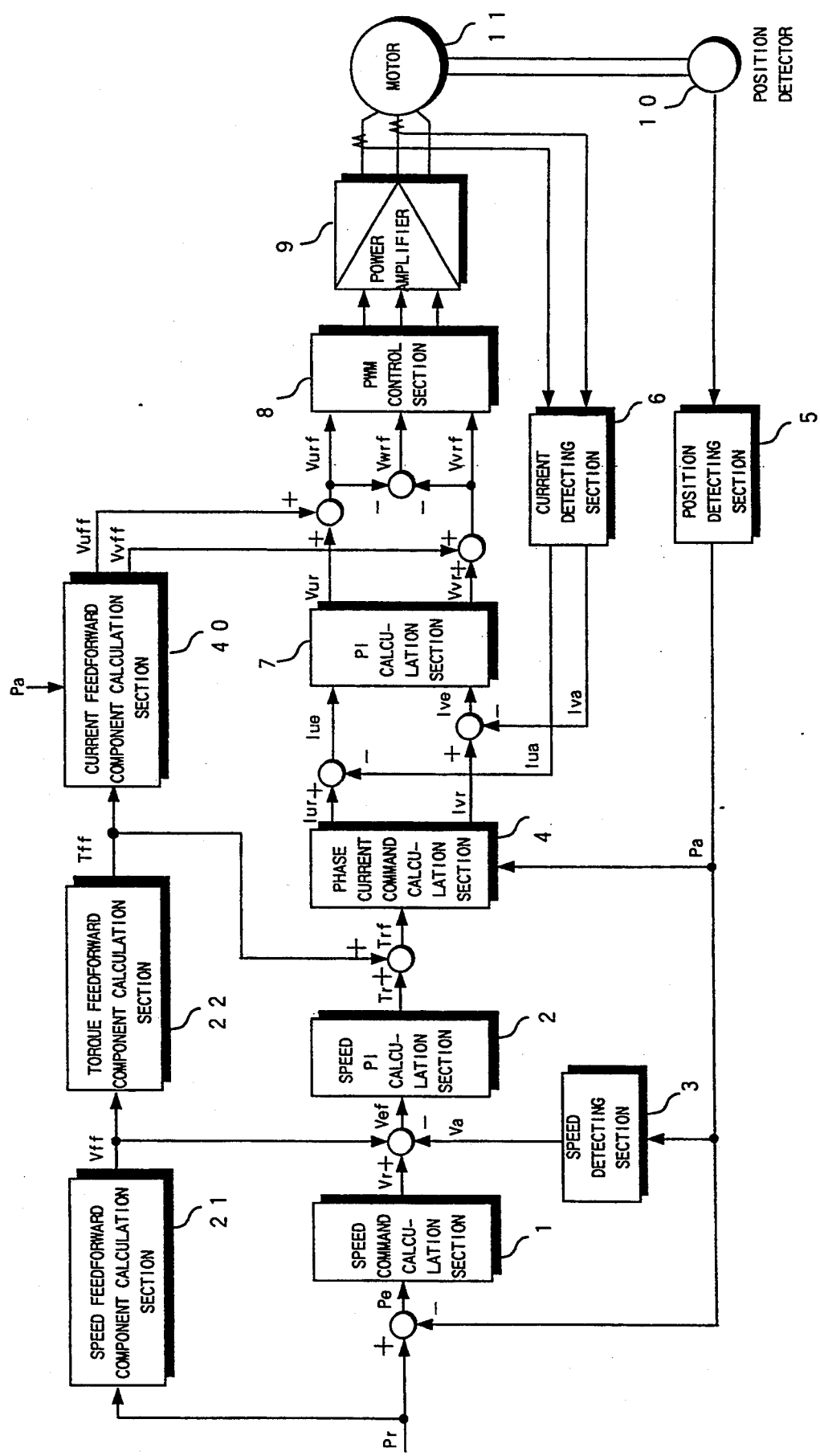
FIG. 9 is a block diagram of the arrangement showing a further example of the motor drive control apparatus according to the present invention.

FIG. 9 is a block diagram of the arrangement showing a further example of the motor drive control apparatus according to the present invention. That is, the motor drive control apparatus includes a speed feedforward component calculation section 21 for creating a speed command component Vff from a position command Pr to a motor 11 by a feedforward method, a torque feedforward component calculation section 22 for creating a torque command component Tff from the speed command Vff by a feedforward method, and a current feedforward component calculation section 40 for creating voltage commands Vuff and Vvff to be imposed on respective phases in such a manner that current commands Iur and Ivr for the respective phases are created for the motor 11 from the torque command component Tff and the position information of the motor 11 and then voltages commands Vuff and Vvff to be imposed on the respective phases are created from these current commands Iur and Ivr for the respective phases and the impedance model of the motor 11. The motor drive control apparatus carries out a feedforward control by using these voltage commands Vuff and Vvff imposed on the respective phases to thereby improve a command follow-up property by removing the time delay element of position, speed and current feedback loops, when a position command is changed. In this case, the speed command Vff can be obtained by differentiating the position command Pr once, is well known in the art. Therefore, the torque command Tff can be obtained by differentiating the position command Pr twice.

As described above, according to the motor drive control apparatus of the present invention, voltage commands to be imposed on the respective phases can be created regardless of the existence of control waste time elements such as a limited gain set in control loops, and the like so that a command follow-up property is improved when a torque is changed, a follow-up error is reduced over an entire region when the torque is changed, and further a stable control can be achieved in the same way as a conventional apparatus at a steady time. As a result, when this apparatus is applied to a machine tool, the quality of a machined product, i.e. the machining accuracy of a workpiece, and the like can be improved as well as greatly reducing the machining time.

What is claimed is:

1. A motor drive control apparatus having a phase current command calculation section for calculating two phase current commands which correspond to a speed command, a PI calculation section for calculating two phase voltage commands which respectively correspond to said two phase current commands, and a current control loop and a speed control loop for controlling the driving of a motor having stator windings each including inductance and resistance, comprising a current feedforward component calculation section including means for receiving said two phase current commands from said phase current command calculation section and including means for calculating differences of values between said continuous current commands for the respective phases, and including means for calculating falling voltage components for the respective phases which have been generated through said inductances of said stator windings for the respective phases of said motor by multiplying said differences for the respective phases by the values of said inductances for the respective phases, and including means for calculating falling voltage components for the respective phases which have been generated through said resistances of said stator windings for the respective phases of said motor by multiplying said current commands for the respective phases by the values of said resistances for the respective phases, and including means for generating feedforward components of said voltage commands for the respective phases by multiplying values equal to sums of said falling voltage components generated through said inductances and resistances for the respective phases by feedforward gains for the respective phases, and an electrical power amplifier including means for receiving said feedforward components from said current feedforward component calculation section and for receiving said voltage commands from said PI calculation section and including means for supplying electric power to said motor which corresponds to values equal to respective sums of said feedforward components of said voltage commands and said voltage commands for the respective phases of said motor so as to drive said motor.

2. A motor drive control apparatus according to claim 1, further comprising a torque feedforward component calculation section including means for creating a feedforward component of a torque command by differentiating a speed command once, and for inputting said feedforward component of said torque command to said current feedforward component calculation section.

3. A motor drive control apparatus according to claim 2, further comprising a speed feedforward component calculation section including means for creating a feedforward component of a speed command by differentiating a position command once, and for inputting said feedforward component of said speed command to said torque feedforward component calculation section.

* * * * *